United States Patent [19]

Schwab et al.

[11] Patent Number: 5,338,556
[45] Date of Patent: Aug. 16, 1994

[54] HIGH INTENSITY MICROWAVE PUFFING OF THICK R-T-E CEREAL FLAKES

[75] Inventors: Edward C. Schwab, New Brighton; George E. Brown, Edina; Kristin L. Thomas, Rosemount; Terry R. Harrington, Albertville, all of Minn.

[73] Assignee: General Mills, Inc., Minneapolis, Minn.

[21] Appl. No.: 20,505

[22] Filed: Feb. 22, 1993

Related U.S. Application Data

[63] Continuation-in-part of Ser. No. 899,574, Jun. 18, 1992, Pat. No. 5,196,218, which is a continuation of Ser. No. 744,546, Aug. 13, 1991, abandoned, which is a continuation-in-part of Ser. No. 726,591, Jul. 8, 1991, abandoned.

[51] Int. Cl.$^5$ .................... A23L 1/00; A21D 15/00
[52] U.S. Cl. .................... 426/241; 426/242; 426/620; 426/621; 426/808
[58] Field of Search .............. 426/241, 242, 620, 621, 426/622, 808

[56] References Cited

U.S. PATENT DOCUMENTS

| | | | |
|---|---|---|---|
| 3,620,764 | 11/1971 | Watkins | 426/241 |
| 3,682,651 | 8/1972 | McAlister | 426/242 |
| 3,868,471 | 2/1975 | Decelles et al. | 426/93 |
| 3,904,429 | 9/1975 | Eastman et al. | 426/242 |
| 3,908,029 | 9/1975 | Fredrickson | 426/242 |
| 4,251,551 | 2/1981 | Van Hulle et al. | 426/242 |
| 4,342,788 | 8/1982 | Clatfelter | 426/243 |
| 4,409,250 | 10/1983 | Van Hulle et al. | 426/242 |
| 4,413,018 | 11/1983 | Webster | 426/618 |
| 4,608,261 | 8/1986 | MacKenzie | 426/242 |
| 4,650,681 | 3/1987 | Greethead | 426/622 |
| 4,800,090 | 1/1989 | August | 426/243 |
| 4,803,090 | 2/1989 | Schlipaluis et al. | 426/242 |
| 4,808,782 | 2/1989 | Nakagawa et al. | 426/241 |
| 4,950,492 | 8/1990 | Shachat et al. | 426/808 |
| 4,965,081 | 10/1990 | Lazarus | 426/242 |
| 4,988,521 | 1/1991 | Fan | 426/621 |
| 5,102,679 | 4/1992 | Whalen | 426/242 |
| 5,180,601 | 1/1993 | Gaon et al. | 426/242 |

FOREIGN PATENT DOCUMENTS

| | | |
|---|---|---|
| 0072878 | 3/1987 | European Pat. Off. . |
| 0312363 | 4/1989 | European Pat. Off. . |
| 0375006 | 6/1990 | European Pat. Off. . |
| 2458226 | 7/1984 | France . |
| 2055285 | 3/1981 | United Kingdom . |
| 2193619A | 2/1988 | United Kingdom . |

*Primary Examiner*—George Yeung
*Attorney, Agent, or Firm*—John A. O'Toole; L. MeRoy Lillehaugen

[57] ABSTRACT

Microwave methods for puffing thick ready-to-eat cereal flake pieces are provided in full or partial substitution for conventional toasting and puffing methods. The methods comprise the step of subjecting a thick (>0.025 inch) cereal base piece to a brief exposure to a high intensity (>125 V/cm) microwave field for about 5 to 25 seconds. The microwave puffed cereal pieces exhibit superior puffed volume and a lighter texture compared to finished products toasted and puffed by known methods. The present methods are particularly suitable for puffing thicker flakes fabricated from whole grain, e.g., whole wheat based cooked cereal doughs.

54 Claims, No Drawings

HIGH INTENSITY MICROWAVE PUFFING OF THICK R-T-E CEREAL FLAKES

CROSS REFERENCE TO RELATED APPLICATIONS

This application is a continuation-in-part application of Ser. No. 899,574, filed Jun. 18, 1992, now U.S. Pat. No. 5,196,218, which is a continuation of Ser. No. 744,546, filed Aug. 13, 1991, now abandoned, which in turn is a continuation-in-part application of Ser. No. 726,591, filed Jul. 8, 1991, now abandoned.

FIELD OF THE INVENTION

The present invention relates to food products and to methods for their preparation. More particularly, the present invention relates to ready-to-eat breakfast cereals and to their methods of preparation.

BACKGROUND

Ready-to-eat ("R-T-E") breakfast cereals are popular packaged food items. R-T-E cereals exist in large numbers of varieties including puffed and unpuffed, regular or presweetened, and including a wide variety of cereal compositions.

Most R-T-E cereals may be grouped into two broad categories, puffed and unpuffed cereals. Unpuffed cereals include 1) flaked cereals (e.g., corn flakes, wheat flakes, rice flakes, mixed grain flakes), and to a lesser extent 2) shredded whole grains, 3) extruded and other shredded cereals, and 4) granola cereals. The preparation of each of these unpuffed cereal types optionally or essentially comprise a toasting operation. For example, typically, the preparation of flaked cereals essentially comprise toasting the flakes. Conventionally, R-T-E cereal flakes are toasted by oven toasting wet cereal flakes. Flake toasting ovens generally include rotating beds flushed with hot air which gently and evenly toasts the flakes. Flake toasting can also be done by fluidized bed hot air heating. The toasting step generally causes a modest increase in volume (e.g., a two-fold or "2×" increase) and for this reason this finish step is sometimes referred to as a toasting and puffing step.

Of course, the skilled artisan distinguishes this toasting and puffing step for flake R-T-E cereals from the puffing of puffable R-T-E cereal pellets for the provision of puffed R-T-E cereals. The puffing step for puffed R-T-E cereals employs more rigorous puffing conditions and apparatus that are designed to achieve greater increases in volume, e.g., five-fold to nine-fold ("5×-9×").

Generally, such known toasting techniques involve intense heating including radiant and/or conduction heating which involve heat transfer from the exterior of the piece inward. Due to the low density of cereal pieces which insulatively resists conductive heat transfer and due to complex shapes, undesirable scorching of the exterior surface, especially at their edges, can occur prior to the development of desirable toasted flavor by any significant part of the interior of the cereal piece.

In the parent application it was surprisingly discovered that methods employing a high intensity microwave energy toasting step provided surprising improvements in finished R-T-E flake products stability and toasted flavor.

In the present invention, a further improvement is provided in the toasting and puffing of R-T-E cereal flakes; namely, the ability to successfully puff relatively thicker R-T-E cereal wet flakes.

In the conventional flake toasting/puffing methods, the upper limit in the thickness of the wet cereal flakes is dependent upon the composition of the cooked cereal dough from which the wet flakes are fabricated. Generally, whole grain cereal flakes are more difficult to puff than wet cereal flakes fabricated from cooked doughs comprising more refined farinaceous ingredients. For example, for a whole grain wheat cereal flake, a thickness of 0.020 inch is generally employed for the wet flake. As the thickness of the wet flake is increased, its ability to puff decreases resulting in progressively hard and dense finished products. An untoasted flake having a starting thickness of 0.025 inch results in a finished flake product of marginal eating qualities. With a starting wet flake thickness of 0.035 inch, the finished product is too hard for consumer acceptance.

However, for wet flakes fabricated from cooked refined cereal doughs comprising more refined carbohydrate materials, thicker flake thicknesses can be used. For products comprising high levels of sugar and added pure starch (i.e., having a protein content of less than 2% and a total dietary fiber content of less than 5%) the wet flake thickness can range up to 0.050 inch and yet yield an acceptable finished R-T-E cereal.

In view of the state of the art, there is a continuing need for improvements in the cereal processing art for preparing R-T-E cereals employing toasting.

Accordingly, in one embodiment of the present invention, the improvement resides in methods for toasting wet thick cereal flakes comprising whole grain cooked cereal doughs having a flake thickness of at least 0.025 inch ranging up to 0.050 inch.

In another embodiment, the present improvement resides in methods for toasting wet, thick cereal flakes comprising refined cooked cereal doughs having a flake thickness ranging up to 0.100 inch.

Accordingly, it is an object of the present invention to provide improved toasting methods for unpuffed or flake R-T-E cereals.

Still another object of the present invention is to provide methods for cereal processing that can be readily practiced in present commercial cereal processing plants without requiring extensive modification of existing cereal processing processes or equipment.

Another object of the present invention is to provide cereal processing method improvements that can be used to toast more evenly irregular and complexly shaped R-T-E pieces.

Another object of the present invention is to provide cereal processing methods that can provide improvements in product stability so as to allow the reduction or elimination of addition of stabilizers to cereal compositions.

Still another object of the present invention is to provide cereal processing methods that can provide toasted unpuffed cereal pieces exhibiting improvements in the evenness of toasting throughout the cereal piece.

Still another object of the present invention is to provide cereal processing methods that can provide toasted flake R-T-E cereal pieces having a relatively greater thickness.

Still another object of the present invention is to provide cereal processing methods that can provide toasted thick flaked R-T-E cereal pieces fabricated from whole grain cooked cereal doughs exhibiting superior volume increases and eating qualities.

Surprisingly, the above objects can be realized and the present invention provides improved methods for dramatically increasing the thickness of wet R-T-E cereal flakes that can be toasted and puffed to provide finished R-T-E flake cereals. The present invention involves subjecting thick wet R-T-E cereal flakes to a brief exposure to a high intensity microwave field. In its product aspect, the present invention resides in improved thick finished flake R-T-E cereals prepared by microwave toasting characterized by interior toasting.

The present invention is an improvement over our prior invention in the realization that the benefits of high intensity microwave heating can be used to puff and tenderize relatively thicker wet R-T-E cereal flakes for flavor and texture development of a wide variety of cooked cereal dough compositions, and especially those comprising whole grain cereals.

SUMMARY OF THE INVENTION

In its method aspect, the present invention resides in methods of toasting thick untoasted R-T-E cereal flakes with high intensity microwave fields to provide finished toasted relatively thick flake R-T-E cereal products exhibiting improved toasted flavor, volume and eating qualities. The methods comprise the step of subjecting the untoasted thick R-T-E cereal flakes to a brief exposure to a high intensity (>125 V/cm) microwave field for about 5 to 45 seconds. Flake thicknesses can range up to 0.050 inch for whole grain cereals. Flakes fabricated from refined cereal doughs can range up to 0.100 inch in thickness.

In its product aspect, the present invention provides finished flaked R-T-E cereals of greater thickness and which exhibit improved flavor development, flavor stability, color, appearance, size and identity. The finished treated cereal pieces exhibit superior improved flavor resulting from "interior" toasting of the cereal base and also color, appearance, and flake size and identity. Moreover, the finished thicker R-T-E cereal flakes exhibit unexpected and superior resistance to breakage.

DETAILED DESCRIPTION OF THE INVENTION

The present invention provides improved thick flaked R-T-E cereals and improved cereal processing methods for preparing such improved thick flaked R-T-E cereals. The present methods involve subjecting a thick untoasted R-T-E cereal flake to a brief exposure to a high intensity microwave field. The methods of the present invention are described in detail below.

Throughout the specification and claims, percentages are by weight and temperatures in degrees Fahrenheit unless otherwise indicated.

A. Providing A Thick Wet R-T-E Cereal Flake

The present methods involve finish toasting thick untoasted R-T-E cereal flakes. The present starting material comprises a quantity of individual pieces of thick untoasted R-T-E cereal flakes fabricated from cooked cereal dough compositions. The untoasted cereal flakes starting material can comprise a wide variety of shapes, densities, sizes, thicknesses and compositions.

The art is replete with teachings and methods for preparing cooked cereal dough compositions and forming such compositions into untoasted, thick R-T-E cereal flakes and the skilled artisan will have no difficulty in providing such untoasted flakes as a starting material.

Generally, however, in the conventional preparation of untoasted R-T-E cereal flakes, the essential cereal ingredients and other ingredients are combined with water and heat and mild pressure to cook or gelatinize the starchy component of the cereal ingredients. Thereafter, the cooked cereal is combined with the other ingredients and mixed with low shear to form a cooked farinaceous dough. The dough (optionally with added vitamin/mineral fortification) is formed into pellets which are then in turn pressed in flaking rolls to form "untoasted" R-T-E cereal flakes.

A variety of well known cooking methods and equipment can be used to prepare a cooked cereal dough. For example, the untoasted cereal blend can be processed in a cooker extruder or in a pressurized and agitated steam cooker each of which form a cooked cereal dough which in turn is fed to a cereal pellet forming extruder. In another embodiment, the cooking and dough forming steps are performed simultaneously in a conventional high pressure, high shear cooker extruder (e.g., single screw or twin screw extruder) equipped with a pellet-forming diehead. The cooked cereal dough pellets so formed typically range from about 15% to 30% moisture. The pellets can then be dried to about 15% to 20% and tempered to equilibrate the moisture content for the subsequent flaking step.

The present invention is particularly suitable for use in connection with the preparation of toasted whole grain R-T-E cereal flakes from whole grain based cooked cereal doughs. Even more particularly, the present invention is suitable for use in connection with wheat based, especially whole wheat, flaked R-T-E cereals having the following essential ingredients:

| Ingredient | Weight % | Amount (Preferred) |
|---|---|---|
| Bumped whole wheat | 80%–90% | 100 lbs |
| Sugar | 5%–15% | 8–12 lbs |
| Malt syrup | 1%–3% | 1–3 lbs |
| Salt | 0.5%–3% | 0.5–3 lbs |

In the preparation of whole grain based cooked cereal doughs, the whole grains typically require or benefit from extended cooking times. Traditional, low pressure, low shear, extended cook time batch or semicontinuous cookers can be used. The whole grains (whether as intact grains or cut into various sized particles) such as whole wheat are added to water, salt and optionally malt and/or sugar(s) and cooked for extended times to form a cooked whole grain cereal having a desirable cooked flavor. In another embodiment, the whole grain, water and minor ingredients can be formed quickly into a cooked cereal dough using a cooker extruder. Since cook times in a cooker extruder are short, in one minor variation, the grains are partially cooked in a conditioner with steam (atmospheric or slightly pressurized) prior to being fed to the extruder. Such a preconditioning or partial cooking allows the grain to develop a better cooked flavor. In still another variation which has been successfully employed for other types of doughs and cereal products, the extrudate cooked whole grain cooked cereal dough is maintained at elevated pressure (relative to atmospheric) and temperature to further develop or cook the dough such as by being fed directly into to a second extruder or other pressurized vessel for extended times before being fabricated into cereal pellets.

Of course, the present cooked cereal doughs can additionally comprise other whole grain cereals including those of corn, oats, rice, barley and mixtures thereof. While these major grains are most popular, minor useful grains include amaranth, millet, sorghum, triticale, flax and mixtures thereof.

The dried and tempered cereal pellets can be fed to a conventional flaking roll to form "untoasted" R-T-E cereal flakes of the R-T-E cereal composition. The untoasted flakes desirably have a moisture content of about 10% to 20% so as to insure sufficient moisture to properly expand the flake upon toasting to obtain finished dried flakes having desirable eating qualities.

In some methods, however, the untoasted cereal flakes have a moisture content of about 20-30% immediately after the flaking step. These untoasted flakes desirably are next dried using conventional drying equipment and techniques to the above moisture content range.

The untoasted thick cereal flakes prior to microwave toasting desirably have a moisture content adjusted to about 7% to 15%, preferably about 10% to 12%. As a result of the present microwave heating step, the moisture content is reduced to about 1% to 6% to form a finished microwave toasted and expanded thick R-T-E flake cereal. Insufficient moisture prior to microwave heating can result in poor finished product flavor, color, appearance, and shelf stability. However, excessive moisture contents can result in additional undesirable puffing which in turn may adversely affect the finished product's texture, volume, or shape.

Generally, whole grain based R-T-E cereal flakes are more difficult to expand or puff than flakes of other more refined farinaceous dough compositions. Among whole grains, whole oat compositions are notoriously difficult to puff. The resistance to puffing is due in part to the oil and protein grain fractions as well as the bran fraction. For use herein, the term "whole grain" refers to materials containing at least one and preferably all of these non-starch fractions in addition to the starch fraction. The problems of curling and breakage are usually worse for whole grain R-T-E cereal flakes, especially oat flakes.

Using conventional flake toasting/puffing apparatus and techniques, the upper limit on flake thickness (for a fixed concentration of characterizing cereal ingredient) is dependent upon the grain type. Thus, corn flakes will have one thickness as an upper limit on a given toasting system from whole grain wheat flakes or oat flakes.

The thicker the flake, the higher the whole grain concentration, and for harder to puff grains, the more rigorous the conventional toasting technique is required.

Broadly, the untoasted flakes herein are essentially characterized by thicknesses of about 0.015 to 0.150 inch in thickness. More particularly, for whole grain cereal flakes, the flake thickness ranges from about 0.025 to 0.050 inch, preferably about 0.025 to 0.030 and for best results about 0.025. For those embodiments employing refined cooked cereal dough compositions comprising at least 50% whole wheat, the preferred untoasted flake thickness ranges from about 0.020 to 0.100 inch and for best results about 0.050 to 0.100 inch.

The term "refined cereal doughs" is used in contrast to whole grain cereal doughs. "Refined" cereal doughs as used herein refers to those R-T-E cooked cereal dough compositions that do not contain whole grain ingredients (i.e., contain less than about 2% whole grain cereal flour ingredients). More particularly, refined cereal doughs are essentially characterized herein by a low level of a fiber content (typically supplied by the whole grain ingredient). Refined cereal doughs desirably contain herein less than about 5% total dietary fiber or less than about 2 g/oz. Fiber and oil generally adversely affects the ability of the dough composition to expand. Additionally, refined cereal doughs can comprise highly refined cereal doughs. By "highly" refined herein it is meant cereal doughs comprising either pure cereal starch fractions and/or high levels of sucrose as well as being substantially free of whole grain ingredients. Both adding pure cereal starches and moderate levels of sucrose have a beneficial effect on the ability of the dough compositions to expand. Highly refined cereal dough compositions herein comprise about 70% to about 100% of a cereal starch ingredient and/or about 0% to 20% by weight of sucrose.

Of course, within this general outline of cereal processing for the provision of untoasted cereal flakes, a wide variety of particular methods and variations can be used.

B. Exposing the Untoasted Thick Cereal Flakes to a High Intensity Microwave Field To Form a Microwave Toasted Thick Flaked R-T-E Cereal The present methods essentially comprise the step of subjecting the untoasted thick R-T-E cereal flakes to a high intensity microwave field. In the present invention, a high intensity microwave heating step is employed in full substitution for the conventional flake toasting or puffing steps to impart toasting.

Commercial cereal production is generally continuous and the untoasted cereal pieces after shaping and, if required, drying can be, and in preferred embodiments are desirably, fed while still warm (about 110° to 130° F.) to the microwave unit for microwave toasting. Such microwave toasting is also conducted preferably in a continuous manner rather than in batch processing. However, in batch processing where the flakes are allowed to cool prior to microwaving, the microwave heating step is continued slightly longer within the below given duration ranges.

The exposure of the untoasted thick R-T-E cereal flakes to the high intensity microwave field is continued for sufficient time to partially expand (e.g., about a 1.5 to 3.0 expansion ratio) and dry the flakes to desired finish moisture levels and to impart to the finished flakes the desired toasted flavor benefits taught herein.

Surprisingly, the intense microwave heating treatment gives a toasting quality to the product. In part, this effect is surprising because when comparable untoasted cereal base pieces are subjected to lower intensity microwave fields such as are characteristic of consumer microwave ovens, the stability and flavor development benefits are not obtained. Cereal base pieces even when microwave heated in low quantities at low field strengths characteristic of consumer microwave ovens for extended times merely result in finished products undesirably exhibiting hardness and/or charring without the flavor and stability and improved volume benefits provided herein. For reasons not fully understood, the pieces do not toast but quite suddenly transform from untoasted to burnt.

The results of the present methods are additionally surprising because when conventional toasting and puffing apparatus and techniques are employed to process such relatively thick flakes, the resultant finished products exhibit unacceptably hard and dense properties.

More surprisingly, the toasting gradient herein is from the inside of the cereal piece outward rather than being outward to inward as would be obtained by toasting in a conventional toasting oven. Such a toasting is important to providing a more enhanced toasted cereal taste without causing a burnt flavor to develop or undesirable surface dark spots. This toasting attribute is even more important to complexly shaped cereal pieces (e.g., irregularly sized and shaped flakes) compared to more uniformly or simply shaped pieces.

Importantly, the present high intensity microwave exposure step is to be distinguished from heating of the untoasted cereal base pieces in a conventional microwave oven. A conventional microwave oven is characterized by a relatively low field intensity, i.e., about 10 to 20 V/cm. Microwave field intensity can be described, of course, in various ways. In the present invention, the microwave field intensity is described in a conventional manner as a voltage gradient in free space, e.g., volts per centimeter ("V/cm"). For comparison, the field strength of the present invention is about 3 to 10 or more times greater than achieved in a conventional consumer microwave oven. Such high microwave field intensity can in turn involve high energy dissipation (>100 w/g) in the product. In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to prevent premature burn-out of the magnetron by reverse channeling or microwave reflection through the wave guide.

In the present invention, the cereal base pieces are desirably subjected to a microwave density field ranging greater than 125 V/cm or between about 3 to 10 times ("3×–10×") conventional microwave field intensity, preferably 125 to 350 V/cm, more preferably 150 to 300 V/cm. Also, it is preferred to use higher microwave frequencies. Thus, between the two licensed MW frequencies permitted at present, a 2450 MHz frequency is highly preferred to 915 MHz. Higher frequencies importantly give more uniformity in field strength which in turn can result in greater uniformity in the finished product.

Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

Microwave equipment that can provide the desired field strength is commercially available. Useful herein for practicing the present methods are industrially sized microwave ovens from Cober Electronics, Inc. and, preferably APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing.

The particular exposure times will vary depending upon such factors as the degree of toasting preferred, the microwave performance characteristics of the equipment selected including the microwave field characteristics it develops, the microwave absorbing characteristics of the cereal base, the quantity of pieces being processed at any time, the starting and ending moisture contents, flake thickness and composition, etc. However, good results generally are obtained when the untoasted cereal flakes are exposed for times ranging from about 5 to 45 seconds. Better results in terms of finished volume and texture as well as toasting and stability improvements are obtained when exposure times range from about 10 to 30 seconds. For best results, exposure times desirably range from about 15 to 25 seconds. Generally, longer exposure times are selected when greater toasting is desired.

The finished flake R-T-E cereal products include both regular and presweetened and/or coated products prepared from an R-T-E cereal base.

Notwithstanding being expanded herein, the present finished flake cereal pieces have relatively smaller volume, higher density base pieces compared to less dense, more highly expanded "puffed" R-T-E cereals, and have a bulk density ranging from about 0.06 to 0.4 g/cc (4.3 to 29 oz per 124 in$^3$).

The degree to which an untoasted cereal piece or pellet such as the present "untoasted" flake or a cereal pellet expands upon finish heating can be expressed in several conventional ways. The first way and most frequently used is to express the finished product in terms of bulk density, e.g., X ounces per y cubic inches (e.g., 6 to 29 oz per 124 in$^3$ (0.4 g/cc). Typically, the volume measurement selected reflects the cereal manufacturers standard or most frequently sold carton's volume size. Often, these bulk densities are converted to standard units, e.g., 0.5 to 2.3 oz/in$^3$ or expressed metrically as 0.08 to 0.4 g/cc.

A second expression of expansion is referred to as the expansion ratio. The expansion ratio is merely the bulk volume of the finished product divided by the bulk volume of the untoasted cereal flakes or other starting material resulting in a dimensionless number. Typical expansion ratios for flaked cereals range from about 1.5 to 3 ("1.5× to 3×"). In contrast, finished puffed R-T-E cereal products typically have higher expansion ratios, e.g., about 3.5 to 9. For comparison, good popcorn has an expansion ratio of greater than 40.

A surprising advantage of the present method is that thick finished products can be obtained having substantial expansion ratios even when fabricated from cooked cereal doughs comprising substantial amounts of whole grain cereal ingredients.

A further surprising benefit provided herein is that the toasted cereal pieces obtained by the present methods beneficially dramatically exhibit enhanced stability, especially when comprising a triglyceride component, which in turn provides the product with dramatic improvements in shelf life and product quality. This feature is especially desirable for R-T-E cereals fabricated from cereal compositions comprising the oil bearing germ fraction or lipid fraction, especially whole grain compositions such as whole wheat, whole corn, whole barley, whole oats, while rice, whole rye, whole flax or mixed whole grain compositions. An additional advantage is that the present products can be formulated so as to reduce or eliminate added oil stabilizing ingredients such as antioxidants.

Still another advantage of the present invention resides in the reduction in piece breakage. The present microwave toasting step causes less piece breakup than does conventional tumbling bed or hot air fluidized bed toasting. Consumers, of course, find high levels of cereal fines to be undesirable.

The production of flaked R-T-E cereal products by conventional toasting steps typically result in the undesirable small broken pieces referred to in the art as "cereal fines." Removal of such fines prior to packaging frequently results in a yield loss of up to 5%. An advantage of the present high intensity microwave heating step is in the reduction of the fines yield loss due to the less abusive nature of this step.

Another related attribute of flake R-T-E cereals is their breakage tendencies especially after packaging. Fines can be removed by the manufacturer prior to packaging to reduce the level of unwanted fines in the package for the consumer. However, R-T-E cereal breakage can generate cereal fines in the package after sealing occasioned by routine package handling. It is a surprising advantage of the present invention that the breakage tendency of the finished thick R-T-E cereal flakes is lower. As a result, not only are processing yield losses potentially lower but also in-package breakage fines can also be reduced.

For those embodiments to be topically coated, the simplest and preferred variation is to microwave treat the cereal base prior to the application of the sugar coating. In a less preferred embodiment, the coated product can be microwave treated.

In the production of regular, i.e., not presweetened by the application of a sugar coating, the microwave toasted pieces are dried by the toasting operation to a final moisture content of about 3%. In the production of presweetened as well as flavored or bit coated, the microwave toasted pieces can be toasted slightly less to a slightly higher moisture content and charged directly to an enrober at their exiting 6% moisture content and are then tumbled and dried and thus coated with the topical coating materials. As part of the coating operation and subsequent drying, the moisture content is reduced to the required 3% levels.

In certain highly preferred embodiments of the present invention, the microwave toasted R-T-E pieces additionally include a flavor coating such as a presweetening coating. Well known compositions and presweetener coating application techniques can be employed both for sugar coating or when various high potency sweeteners, e.g., aspartame or potassium acetylsulfame. In more preferred embodiments, the presweetening coating comprises sugar and/or corn syrup, a flavor constituent, oil and/or vitamins. The addition of a flavor constituent to the sugar coating solution is preferred due to flavor losses that can occur from the toasting or puffing steps practiced herein. These steps, due to their heat application, tend to drive off the volatile flavor constituents leading to flavor degradation or loss. In certain other preferred embodiments, the coating can also include particulates such as fruit and nut pieces and/or small cereal grain flakes.

After microwave toasting, the microwave treated finished thick R-T-E flake cereal is allowed to cool to ambient temperature and then subsequently packaged and distributed in conventional manner.

The present methods are generally useful in the provision of improved flaked R-T-E cereal products intended for consumption as breakfast cereals. Surprisingly, however, the present invention is also particularly suited for preparing non-fried cereal based snack products, e.g., whole grain corn tortilla chips. In these present product executions, the products are in the form of slightly puffed flakes or chips having a finished thickness of about 0.050 to 0.125 inch. In the past, such expanded products of such thickness comprising whole grain ingredients could be obtained only by puffing using deep fat frying. While the use of microwave to puff puffable cereal pellets is well known including high intensity microwave heating for snack products, such pellets usually are fabricated from refined cooked cereal doughs rather than from whole grain based cooked cereal doughs. Moreover, the present invention can be used with large toasted whole grain chips or flakes herein ranging in size from about 0.5 to 10 g per chip or flake, preferably about 1.0 to 2.0 g per chip or flake, rather than the smaller pieces and lower aspect ratios (i.e., ratio of longest dimension to shortest dimension). Surprisingly herein, chips having aspect ratios >50:1 and even >80:1 can be successfully toasted with good expansion ratios.

An advantage of the present invention is that the present microwave toasting herein involves less physical abuse of the cereal flakes. Conventional flake toasting which involves a rotating bed of flakes can result in flake breakage. The present microwave toasting methods eliminate the tumbling of the flakes and allows the use of thicker flakes, thus markedly reducing flake breakage and reducing the undesirable generation of cereal fines.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

In order to show the benefits of finish toasting flakes by the method of the present invention, a corn flake was prepared with the following formula:

| Ingredient | Weight % |
| --- | --- |
| Corn cones | 91.7% |
| Sugar | 5.3% |
| Salt | 2.0% |
| Minor ingredients | 1.0% |
| | 100.0% |

The cereal ingredients were formed into a cooked cereal dough in a continuous cooker, pelletized, and formed into untoasted flakes having a thickness of 0.050 inch. The flakes were dried in an oven to a moisture of about 14%. These flakes were fed to the high intensity microwave unit at a feed rate of 1 lb/min. The variable power was set at 10.5 kW and the residence time at 16 seconds in the microwave chamber. The field intensity during the microwave finish toasting was about 200 V/cm. The microwaved product had a very toasted flavor, somewhat darker color than the feed product and a puffed-like texture. The corn flavor was also enhanced.

EXAMPLE 2

A whole wheat vitamin fortified R-T-E cereal is prepared having the following formulation:

| Ingredient | Weight % |
| --- | --- |
| Wheat cereal | 84.24 |
| Sugar | 10.00 |
| Tricalcium phosphate | 1.70 |
| Malt syrup | 1.60 |
| Salt | 1.40 |
| Vitamin mix | 0.60 |
| Sodium ascorbate | 0.20 |
| Annatto food coloring | 0.10 |
| Trisodium phosphate | 0.10 |
| Vitamin A-D blend | 0.05 |
| Antioxidant BHT spray dried | 0.01 |
| | 100.00% |

The R-T-E cereal is in the form of partially dried flakes having a moisture content of about 10% prior to high intensity microwave toasting.

The whole wheat flakes are then finish toasted by high intensity microwave heating as in Example 1 except that the power setting was 9 kW, a feed rate of 1.3 lb/min, a residence time of 36 sec, a final moisture content of 2.65% and a field intensity of about 174 V/cm. The finished product exhibited good color and improved toasted wheat flavor.

EXAMPLE 3

A thick flaked cereal piece is fabricated from a refined cereal dough having the following formulation:

| Ingredient | Weight % |
| --- | --- |
| Wheat flour | 40% |
| Rice flour | 32 |
| Sucrose | 13 |
| Maltodextrin | 5 |
| Dextrose | 4 |
| Oil | 3 |
| Salt | 2 |
| Emulsifier, phosphate salts, flavor | 1 |
| | 100% |

The above formulation is fabricated into rectangular flake pieces having a moisture content of 12% and a thickness of 0.050 inch.

A quantity of such flakes are subjected to a high intensity microwave treatment step to form puffed finished R-T-E cereal pieces. The finish moisture content is 2%. The flakes are treated using an APV microwave unit having a 13.5 kW rated capacity. The microwave field strength was controlled to 200 V/cm and the unit is operated at full power. The feed rate was 2 lbs of pellets per minute to achieve a residence time of about 23 seconds.

EXAMPLE 4

A thick flaked cereal piece is fabricated from the whole wheat cereal dough having the formulation of Example 1 and is fabricated into flakes having a thickness of 0.020 inch and a moisture content of 18%. A first sample quantity is then toasted and puffed in conventional manner in a fluidized bed toaster to a final moisture content of 2.5%. The finished conventionally toasted R-T-E cereal had a bulk volume of 125 in³/oz of cereal. This volume represents the ideal volume achieved by thin flakes using conventional toasting techniques and is used as a standard for comparison.

A second quantity of the Example 1 formulation is fabricated into flake pieces having a moisture content of 18% and a thickness of 0.030 inch.

For comparison, a quantity of such flakes are toasted using a fluidized bed toaster to form toasted puffed finished R-T-E cereal pieces. The finish moisture content is 2%. The finished bulk volume is only 90 in³/oz. This bulk volume value is low relative to the ideal volume and indicates a poor volume result.

A second quantity of such 0.030 inch thick flakes are subjected to a high intensity microwave treatment step to form puffed finished R-T-E cereal pieces. The finish moisture content is 2%. The second quantity pellets are treated using an APV microwave unit having a 13.5 kW rated capacity and operated at 9 kW. The microwave field strength was controlled to 200 V/cm. The feed rate was 2 lbs of pellets per minute to achieve a residence time of about 23 seconds.

The microwave treated finished R-T-E cereal had a bulk volume of 110 in³/8 oz reflecting a 30% increase in puff volume compared to the bulk volume of the similar product prepared by fluidized bed toasting. This bulk volume, while not as high as the ideal volume achieved using thin flakes, is nonetheless unexpectedly higher than using the best conventional technique of jet zone heating.

The results of this comparative testing demonstrate that high intensity microwave toasting of thick flake pellets fabricated from a cooked whole wheat cereal dough unexpectedly produces superior results in terms of puffing to prepare a finished thick flaked whole grain R-T-E cereal.

EXAMPLE 5

A thick flaked cereal piece is fabricated from the whole cereal dough having the formulation of Example 1.

For a comparison similar to Example 4, the above formulation is fabricated into flake pieces having a moisture content of 18% and a thickness of 0.090 inch.

A first quantity of such flakes are toasted using a fluidized bed toaster to form toasted puffed finished R-T-E cereal pieces. The finish moisture content is 2%. The finished product is inedible due to hardness.

A second quantity of such flakes are subjected to a high intensity microwave treatment step to form puffed finished cereal chip pieces. The finish moisture content is 2%.

The second quantity pellets are treated using an APV microwave unit having a 13.5 kW rated capacity. The unit is operated at 10.5 kW. The microwave field strength was controlled to about 200 V/cm. The feed rate was 2 lbs of pellets per minute to achieve a residence time of about 23 seconds.

In contrast to the finished product prepared by conventional fluidized bed toasting and puffing, the microwave treated finished cereal chips exhibited a crisp light texture that is highly desirable.

The results of this comparative testing demonstrate that high intensity microwave toasting of thick flake pellets fabricated from a cooked whole wheat cereal dough unexpectedly produce superior results in terms of finished eating quality compared to conventional fluidized bed toasting.

What is claimed is:

1. A method for expanding and tenderizing a flake R-T-E cereal base to improve its flavor and texture, comprising the step of:

A. providing untoasted, unexpanded R-T-E cereal flakes
  1) having a moisture content ranging from about 8% to 20%, and
  2) having a flake thickness of about 0.025 to 0.150 inch,
B. heating the untoasted R-T-E cereal flakes with a high intensity microwave field for a sufficient period of time to provide an expanded and tenderized finished flake R-T-E cereal having a moisture content of about 1% to 5% and an expansion ratio of at least 1.5,
  wherein the microwave field has a field strength of about 125–350 V/cm.

2. The method of claim 1 wherein the untoasted R-T-E cereal flakes have a moisture content of about 8% to 15% by weight.

3. The method of claim 2 wherein the cereal flakes are fabricated from a whole grain cooked cereal dough.

4. The method of claim 3 wherein the finished flake R-T-E cereal has a bulk density ranging from about 4.3 to 29 oz/124 in$^3$ (0.06 to 0.4 g/cc).

5. The method of claim 4 wherein the microwave heating step is continued for about 5 to 45 seconds.

6. The method of claim 5 wherein the R-T-E cereal flakes are fabricated from a cereal composition comprising at least 80% of a whole cereal grain and/or degermed whole cereal grain.

7. The method of claim 6 wherein the R-T-E cereal flakes are fabricated from a cereal composition comprising a whole grain selected from the group consisting of whole wheat, whole corn, degermed corn, whole oats, whole rice, whole barley, whole flax, whole rye and mixtures thereof.

8. The method of claim 7 wherein the microwave field density is about 200–350 V/cm,
  wherein the expanded flakes have a thickness of about 0.025 to 0.050 inch, and
  wherein the untoasted flakes have an initial bulk density of about 0.10 to 0.3 g/cc.

9. The method of claim 8 additionally comprising the step of:
  applying a topical sweetener coating to the microwave expanded and tenderized flake R-T-E cereal to form a presweetened R-T-E finished flake cereal.

10. The method of claim 8 wherein the cereal flakes are fabricated from a cooked cereal dough comprising at least 50% whole wheat.

11. The method of claim 8 wherein the cereal flakes are fabricated from a cooked cereal dough comprising whole wheat and degermed corn.

12. The method of claim 11 wherein the cereal flakes are fabricated from a cooked cereal dough comprising whole wheat and whole corn or whole oats.

13. The method of claim 8 wherein the cereal comprises a whole oat flake, and wherein the finished R-T-E flake cereal has a bulk density of about 0.10 to 0.20 g/cc.

14. The method of claim 8 wherein the cereal flake comprises a whole corn flake.

15. The method of claim 10 wherein the cereal base is a whole wheat flake, and wherein the finished R-T-E flake cereal has a bulk density of about 0.06 to 0.15 g/cc.

16. The method of claim 2 wherein the cereal flake is fabricated from a refined cereal dough.

17. The method of claim 16 wherein the refined cereal dough comprises (dry weight basis)
  1) about 60% to 90% of a cereal flour,
  2) about 4.5% to 20% of a carbohydrate sweetening agent,
  3) about 5% to 20% of a cereal starch or maltodextrin, and
  4) about 0.5% to 3.0% of salt, and
  wherein the dough has a total dietary fiber content of less than about 2 g/oz.

18. The method of claim 17 wherein the untoasted cereal flake has a thickness ranging from about 0.050 to 0.100 inch.

19. The method of claim 18 wherein the finished flake R-T-E cereal has a bulk volume of $>110$ in$^3$/8 oz.

20. The product prepared by the method of claim 1.
21. The product prepared by the method of claim 2.
22. The product prepared by the method of claim 3.
23. The product prepared by the method of claim 4.
24. The product prepared by the method of claim 5.
25. The product prepared by the method of claim 6.
26. The product prepared by the method of claim 7.
27. The product prepared by the method of claim 8.
28. The product prepared by the method of claim 9.
29. The product prepared by the method of claim 10.
30. The product prepared by the method of claim 11.
31. The product prepared by the method of claim 12.
32. The product prepared by the method of claim 13.
33. The product prepared by the method of claim 14.
34. The product prepared by the method of claim 15.
35. The product prepared by the method of claim 16.
36. The product prepared by the method of claim 17.
37. The product prepared by the method of claim 18.
38. The product prepared by the method of claim 19.

39. The method of claim 15 wherein the untoasted R-T-E cereal flake is fabricated from a cooked cereal dough comprising:
  1) about 80% to 90% of a cereal grain selected from the group consisting of whole wheat, oats, rice, corn, barley, flax and mixtures thereof,
  2) about 5% to 15% sugar,
  3) about 1% to 3% malt syrup, and
  4) about 0.5% to 3% salt.

40. The product prepared by the method of claim 39.

41. The method of claim 8 wherein the cereal base is in the form of a partially toasted flake.

42. A method for preparing a snack chip, comprising the steps of:
  A. providing untoasted, unexpanded cereal chips
    1) having a moisture content ranging from about 7% to 15%, and
    2) having a thickness of about 0.075 to 0.150 inch;
  B. heating the untoasted cereal chips with a high intensity microwave field for a sufficient period of time to provide interiorly toasted and expanded finished R-T-E cereal chips having a moisture content of about 1% to 5% and an expansion ratio of at least 1.5,
wherein the microwave field has a field strength of about 125–350 V/cm.

43. The method of claim 42 wherein the chips have an aspect ratio of >25:1.

44. The product prepared by the method of claim 43.

45. A method for preparing a thick, toasted R-T-E flake cereal exhibiting superior flavor, texture and resistance to breakage, comprising the steps of:
   A. providing a quantity of cereal pellets fabricated from a cooked cereal dough,
   B. flaking the cereal pellets to form cereal flakes having an initial moisture content of about 7% to 18%,
   C. drying the cereal flakes to an intermediate moisture content to form untoasted cereal flakes, and
   D. heating the untoasted cereal flakes with a high intensity microwave field for a sufficient period of time to provide an interiorly toasted and expanded toasted flake R-T-E cereal having a moisture content of about 1% to 5% and an expansion ratio of at least 1.5,
   wherein the microwave field has a field strength of about 125–350 V/cm.

46. The method of claim 45 wherein in Step G the untoasted cereal flakes have a moisture content of about 8% to 12% by weight.

47. The method of claim 46 wherein in Step B the cereal flakes are fabricated from a whole grain cooked cereal dough.

48. The method of claim 47 wherein the toasted cereal flakes each weigh about 0.5 to 10 g.

49. The method of claim 48 wherein the microwave heating step is continued for about 5 to 45 seconds.

50. The method of claim 49 wherein in Step B the cereal flakes are fabricated from a cereal composition comprising at least 80% of a whole cereal grain, and
wherein step D is practiced immediately thereafter without substantial cooling.

51. The method of claim 50 wherein the R-T-E cereal base is fabricated from a cereal composition comprising a whole grain selected from the group consisting of whole wheat, whole corn, whole oats, whole rice, whole barley, whole flax, whole rye and mixtures thereof.

52. The method of claim 51 wherein the microwave field density is about 250–350 V/cm,
wherein the untoasted cereal flakes have a thickness of about 0.025 to 0.050 inch, and
wherein the untoasted cereal flakes have an aspect ratio of >50:1.

53. The method of claim 52 wherein the cereal dough composition comprises a whole grain corn.

54. The method of claim 53 wherein the whole grain corn is a masa corn.

* * * * *